United States Patent [19]

Mouri et al.

[11] Patent Number: 4,564,907

[45] Date of Patent: Jan. 14, 1986

[54] ELECTRONIC CONTROL APPARATUS FOR INTERNAL COMBUSTION ENGINE

[75] Inventors: Yasunori Mouri; Osamu Abe, both of Katsuta, Japan

[73] Assignee: Hitachi, Ltd., Tokyo, Japan

[21] Appl. No.: 371,574

[22] Filed: Apr. 26, 1982

[30] Foreign Application Priority Data

Apr. 30, 1981 [JP] Japan ................................ 56-66371

[51] Int. Cl.[4] ...................... G05B 15/02; F02M 51/00

[52] U.S. Cl. ............................... 364/431.10; 123/424; 123/491

[58] Field of Search ...................... 364/431.10, 431.11; 123/421, 424, 471, 491, 492, 493; 73/118, 118 A

[56] References Cited

U.S. PATENT DOCUMENTS

| | | | |
|---|---|---|---|
| 4,275,694 | 6/1981 | Nagaishi | 123/479 X |
| 4,322,970 | 4/1982 | Peter | 73/118 A |
| 4,337,513 | 6/1982 | Furuhashi | 364/431.11 |
| 4,351,297 | 9/1982 | Suematsu | 123/421 |
| 4,356,803 | 11/1982 | Miyagi | 123/492 |

OTHER PUBLICATIONS

Bowler: Throttle Body Fuel Injection, Automotive Engineering, Oct. 1980, vol. 88, No. 10, pp. 102–110.

Walters: Electronic Emission Control Diagnoses Its Own Problems, Automotive Engineering, Aug. 1980, vol. 88, No. 8, pp. 43/49.

Grimm et al: GM Micro Computer Engine Control System, SAE Paper #800053, 1980 Soc. of Automot. Engineers.

*Primary Examiner*—Felix D. Gruber

*Attorney, Agent, or Firm*—Antonelli, Terry & Wands

[57] ABSTRACT

An electronic control apparatus for an internal combustion engine in which a quantity of intake air fed to the engine cylinders is detected by processing an output signal produced by an air flow sensor incorporating a heat generating element and an optimal quantity of fuel corresponding to the detected intake air flow is supplied to the internal combustion engine. Arrangement is made such that the internal combustion engine can be operated with an optimal fuel supply even when the heat generating element electrically energized is not yet heated to a predetermined temperature.

12 Claims, 21 Drawing Figures

| TASK LEVEL | $2^7$ | ---- | ---- | ---- | ---- | $2^2$ | $2^1$ | $2^0$ |
|---|---|---|---|---|---|---|---|---|
| 0 --- | R0 | | | | | $Q_2$ | $Q_1$ | $Q_0$ |
| 1 --- | R1 | | | | | $Q_2$ | $Q_1$ | $Q_0$ |
| 2 --- | R2 | | | | | $Q_2$ | $Q_1$ | $Q_0$ |

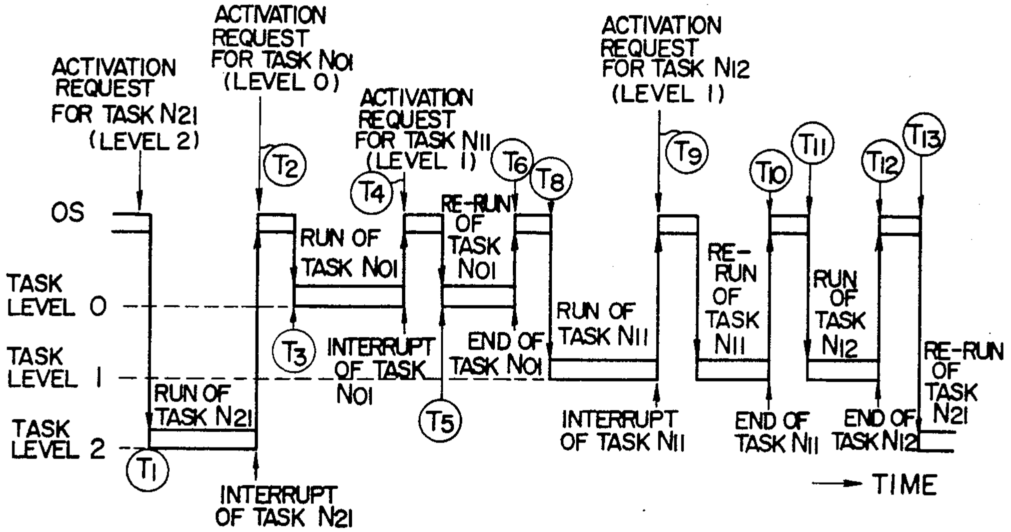
FIG. 13
FIG. 14
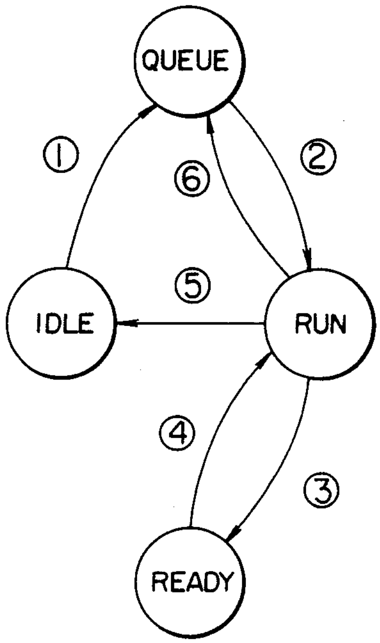

ELECTRONIC CONTROL APPARATUS FOR INTERNAL COMBUSTION ENGINE

The present invention relates generally to a control apparatus for an internal combustion engine. In particular, the present invention is directed to a control apparatus for an internal combustion engine in which an air flow sensor of a type incorporating a heat generating element is employed for measuring an intake air flow, whereby a quantity of fuel corresponding to the measured intake air flow is supplied to the internal combustion engine.

In motor vehicles, the supply of fuel to the internal combustion engine (hereinafter also referred to simply as the engine) has usually been effected by utilizing a negative pressure or vacuum available in the engine. However, in recent years, exhaust gas discharged from the motor vehicles has brought about serious problems concerning air pollution. Under the circumstances, statutory regulations imposed on the content of nitrogen oxides and carbon monooxide contained in the exhaust gas discharged from the motor vehicles become more severe, and difficulty is encountered in controlling the exhaust gas so as to meet the regulation with the aid of the hitherto known fuel supply system in which the negative pressure of the intake air flow is made use of for controlling the fuel quantity supplied to the engine. Further, in order to improve the fuel-performance factor as well as power output performance of the internal combustion engine, a proper relationship is required to be established between the intake air flow and the fuel supply quantity. To deal with these problems, there has been increasingly adopted a fuel supply control system in which the intake air flow is measured to thereby determine the fuel supply quantity on the basis of the measurement of the intake air flow, whereby the quantity of fuel thus determined or controlled is forcively atomized and injected in the engine. The intake air flow in concern is measured by means of a vane type intake air flow meter which includes a valve vane rotatable in dependence on the intake air flow. Thus, the latter is detected in terms of the opening degree of the valve vane. More specifically, as the vane is rotated, resistance value of a slider resistor undergoes corresponding variation which in turn provides a measure for the intake air flow. However, the vane type intake flow meter system suffers a shortcoming in that the air flow can be detected only with a time delay because of some inevitable delay in the rotation of the valve vane in response to variation or change in the air flow. In other words, the hitherto known vane type air flow meter can not respond to small changes in the intake air flow, involving correspondingly degraded detection accuracy and sensitivity, to a disadvantage. Further, because variations in the intake air flow are detected in terms of variations in the resistance value of the slider resistor as brought about by rotation of the valve vane, it is impossible to measure the intake air flow with a reasonable accuracy by following variations in the air flow with a high fidelity.

Under the situation, there has been developed an intake air flow measuring system which is realized by utilizing a non-linear relation between a quantity of heat loss of a heat generating element and the rate of air flow. As a typical example of a such system, a hot wire type air flow measuring system can be mentioned in which a hot wire is employed as the heat generating element. In conjunction with this type air flow meter, there is also known and adopted widely a so-called constant temperature difference drive method which is effected by using a bridge circuit such as one shown in FIG. 1 of the accompanying drawings. Referring to this figure, the drive circuit comprises a transistor Tr having an emitter to which a hot wire HW and a temperature compensating resistor (also referred to as the cold wire) CW are connected. The other end of the hot wire HW is grounded to earth through a resistor R1, while the other end of the temperature compensating resistor CW is grounded to earth through a resistor R2. A junction between the hot wire HW and the resistor R1 is connected to a minus (−) input terminal of an operational amplifier OA which has a plus (+) input terminal connected to a junction between the temperature compensating resistor CW and the resistor R2. An output terminal $V_{out}$ is connected to a junction between the hot wire HW and the resistor R1. The operational amplifier OA has an output terminal connected to a base of the transistor Tr which also has a collector supplied with a constant source voltage. With such a circuit arrangement as described above, when temperature of the hot wire HW is varied to change correspondingly the resistance value thereof, the bridge circuit constituted by the hot wire HW, the temperature compensating resistor CW and the resistors R1 and R2 is put in the unbalanced state, resulting in that an output voltage signal which bears a predetermined relationship to the air flow is produced from the output terminal $V_{OUT}$. More specifically, the bridge circuit shown in FIG. 1 is in the balanced state when the cold wire CW senses a temperature of the intake air flow while the hot wire HW is at a temperature which is higher than that of the intake air flow by a predetermined magnitude. As heat is taken away from the hot wire HW by the air flow, a correspondingly increased current will flow to the hot wire HW, whereby the balanced state mentioned above is sustained. Since the diameter of the air flow passage is constant, the rate (flow speed) of air flow is in proportion to the quantity (volume) of air flow. Accordingly, the quantity of heat taken away from the hot wire HW which can be derived in terms of change of the voltage produced from the output terminal $V_{OUT}$ can represent the current or instantaneous intake air flow.

By virtue of such characteristic feature of the hot wire type air flow measuring apparatus that the nonlinearity output characteristic thereof renders uniform or equalizes relative errors and thus can assure a wide dynamic range, data or quantity outputted from the air flow measuring apparatus can be advantageously used as a factor for controlling the fuel supply to the engine in the optimum control of the internal combustion engine.

In this regard, it is to be noted that since the intake air flow quantity is measured on the basis of heat quantity deprived of or dissipated from the hot wire HW serving as the air flow sensor in the case of the air flow measuring apparatus of the hot wire type or more generally of a heat generating element type, the hot wire or heat generating element HW is required to be previously heated to a predetermined constant temperature. In other words, only when the temperature has attained the predetermined value, the hot wire can then serve as the proper air flow sensor. In the initial phase in which the bridge circuit is just connected to a power supply source, the hot wire or heat generating element HW is in a cold state with the bridge circuit being unbalanced.

As the result, the bridge circuit is electrically driven so that the temperature of the hot wire is rapidly increased (i.e. the balanced state of the bridge circuit can be rapidly attained). Thus, the output ($V_{OUT}$) characteristic of the hot-wire bridge circuit as a function of time is such as depicted in FIG. 2. Only in the saturated state (attained after time lapse of about 4 sec.), the bridge circuit is balanced. Accordingly, during a time span required for the bridge circuit to reach the balanced state (i.e. until a time point at which the saturation occurs, the output signal $V_{OUT}$ of the sensor bridge circuit will be of significant magnitude representing the presence of a great intake air flow, even if the air flow is in reality zero, as is illustrated by a hatched area in FIG. 2.

Under the circumstances, when an ignition switch is closed immediately after the closing of a key switch in the engine starting phase or mode of a motor vehicle, the intake air flow is detected before the hot wire sensor is sufficiently heated. More specifically, energization of the hot wire (HW) sensor is initiated at a time point when the key switch denoted by a symbol KSW in FIG. 1 is turned on, and at the same time a control circuit 64 described hereinafter is also turned on. At that time, the detection output signal produced by the sensor will represent the presence of a significantly large quantity of the intake air flow notwithstanding the fact that the air flow is in reality of a very small quantity, because the hot wire is not yet sufficiently heated up. As the consequence, an erroneous fuel supply quantity is arithmetically determined on the basis of the false output value of the hot wire sensor in an associated micro-computer, resulting in that excessively richer fuel is supplied, involving increased monooxide (CO) content of the exhaust gas and thereby degrading the fuel-performance factor, to disadvantages. Further, there may arise the stoppage or shutdown of the engine in the worst case due to the excessively richer fuel supply incompatible with the output power. Certainly, the above problem is not so serious in the case where the engine operation is to be started from the cold state, because a preparatory warming-up of the engine is then required by supplying enriched fuel mixture thereto. However, when the motor vehicle is started again after a rest interval of several to ten minutes, the problem mentioned above cannot be neglected when considering the fact that there exists a difference between the cooling rate of the engine (requiring several ten minutes) and that of the hot wire sensor (about four seconds).

An object of the present invention is therefore to provide a control apparatus for an internal combustion engine which is capable of assuring an optimal fuel supply even in an initiating or starting phase or mode of the engine operation.

According to a characteristic feature of the present invention, the internal combustion engine can be operated with an optimal fuel supply even during a period in which a heat generating element used in an intake air flow measuring apparatus is not yet heated up to a predetermined temperature after initiation of electric energization of the heat generating element, so that the internal combustion engine is operated normally, whereby content of carbon monooxide (CO) is prevented from being increased with fuel-performance factor also being prevented from degradation.

According to another aspect of the present invention, it is proposed to detect whether or not a predetermined time has elapsed since turning-on of a key switch of the engine, wherein the quantity of fuel supplied to the engine is determined by certain other control factor before the lapse of the predetermined time, while the fuel supply is controlled on the basis of the output signal from the air flow measuring apparatus incorporating the heat generating element after the lapse of the predetermined time duration, to thereby assure the optimal fuel supply to the engine even in the starting phase thereof.

The air flow detecting apparatus which can be used in the control apparatus according to the invention may be constituted by any apparatus which includes the heat generating element in combination with an electric circuit adapted to produce an output signal representative of a quantity of heat deprived of or taken away from the heat generating element to thereby detect the intake air flow. The circuit for producing the signal representative of the quantity of heat deprived of from the heat generating element may be either of a type in which the signal is produced on the basis of variation in energy supplied to the heat generating element or of a type in which the signal is derived directly from the heated air (e.g. Thomas meter).

The above and other objects, features and advantages of the present invention will be more apparent from the following description taken in conjunction with the accompanying drawings, in which:

FIG. 13 is a view to illustrate an example of a task priority control;

FIG. 14 is a view illustrating transitions of the state of the task in the task priority control illustrated in FIG. 13;

Now, the invention will be described in detail in conjunction with the exemplary embodiments thereof. In the following description, it is assumed that the invention is applied to a fuel injection type internal combustion engine. However, it will be readily understood that the invention can be equally applied to an internal combustion engine of a type in which a carburetor is used.

Figure 1:
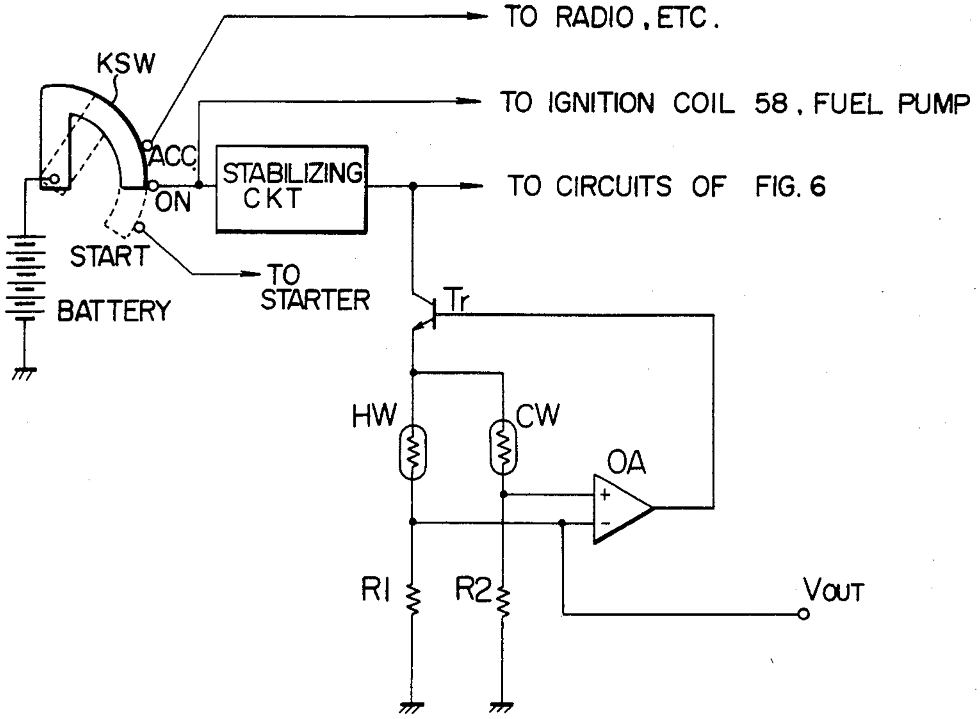
FIG. 1 is a circuit diagram to illustrate schematically an arrangement of an intake air flow measuring apparatus incorporating a hot wire sensor element.
Figure 2:
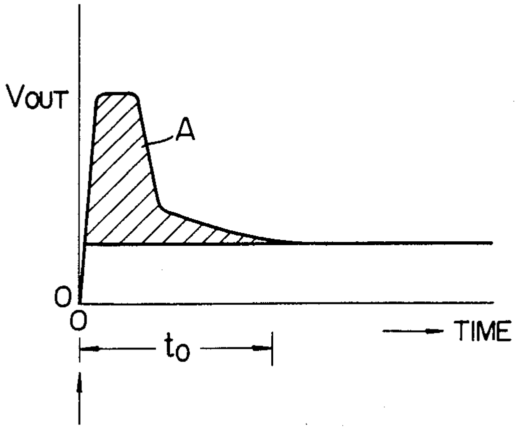
FIG. 2 is a characteristic diagram illustrating graphically a profile of variation in the output signal produced from the intake air flow measuring circuit as a function of time elapsed since connection of the circuit to a predetermined power supply source.
Figure 3:
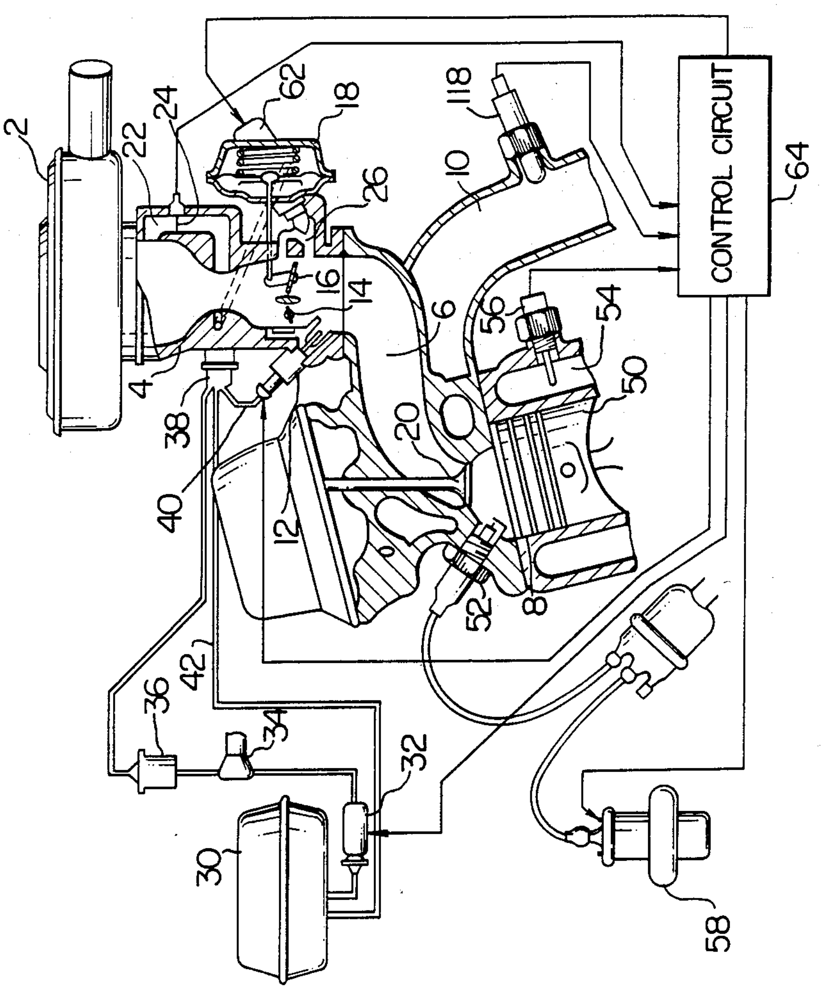
FIG. 3 shows a structure of a control apparatus for a whole engine system.

Referring to FIG. 3 which shows a control apparatus for the whole system of the fuel injection type internal combustion engine, suction air is supplied to engine cylinders 8 from an air cleaner 2 through a throttle chamber and an air intake conduit or manifold 6. Combustion product gas is exhausted to the atmosphere from the cylinders 8 though an exhaust conduit 10.

There is provided in the throttle chamber 4 an injector 12 for fuel injection. The fuel injected from the injector 12 is atomized in an air passage provided within the throttle chamber 4 and mixed with air to thereby form a fuel-air mixture which is then supplied to combustion chambers of the engine cylinders 8 through the intake manifold 6 and associated air suction valves 20.

Throttle valves 14 and 16 are provided in the vicinity of the outlet orifice of the injector 12 at the upstream side thereof. The throttle valve 14 is mechanically interlocked with an acceleration pedal so as to be operated by a driver. On the other hand, the throttle valve 16 is arranged to be controlled by a diaphragm chamber 18 in such manner that the valve 16 is fully closed in a range of a small air flow, while the throttle valve 16 is increasingly opened as a function of a negative pressure in the diaphragm chamber 18 which pressure in turn is increased as the air flow is increased, thereby to prevent resistance to the air flow from being increased.

A bypass air passage 22 is disposed in the throttle chamber 4 upstream of the throttle valves 14 and 16. An electric heater element or hot wire 24 constituting a part of a thermal type air flow meter is disposed in the air passage 22. Derived from the thermal type air flow meter is an electric signal which varies in dependence on the air flow speed and the thermal conductivity of the heater element 24. Because of being disposed in the bypass passage 22, the hot wire element 24 is protected from adverse influence of a high temperature gas produced upon occurrence of back-fire in the cylinders 8 as well as from contamination due to dusts carried by the suction air flow. The heat generating element 24 which may also be constituted by a film-like element implemented on an insulator substrate through thin film technique or thick film technique in place of a so-called hot wire hitherto known is disposed in the air passage. The outlet of the bypass air passage 22 is located in the vicinity of the narrowest portion of a Venturi structure, while the inlet port of the bypass passage 22 is opened in the throttle chamber upstream of the Venturi.

The fuel is supplied to the fuel injector 12 from a fuel tank 30 through a fuel pump 32, a fuel damper 34, a filter 36 and a fuel pressure regulator 38. The fuel pressure regulator 38 serves to control the pressure of fuel supplied therefrom to the injector 12 through a pipe 40 so that difference between the pressure of fuel supplied to the injector 12 and the pressure prevailing in the suction manifold 6 into which the fuel is injected is maintained constantly at a predetermined value. Reference numeral 42 denotes a feed-back pipe through which fuel in excess is returned to the fuel tank 30 from the fuel pressure regulator 38.

The fuel-air mixture sucked through the suction valve 20 is compressed by a piston 50 within the cylinder and undergoes combustion as ignited by a spark produced at a spark plug 52. The cylinder 8 is cooled by cooling water the temperature of which is measured by a water temperature sensor 56. The output quantity from the sensor 56 is utilized as a control parameter representing the temperature of the engine. The spark plug 52 is supplied with a high voltage pulse from an ignition coil 58 in a proper ignition timing.

A crank angle sensor (not shown) is provided in combination with a crank shaft (not shown) of the engine for producing a reference angle signal for every reference crank angle and a position signal for every predetermined angle (e.g. 0.5°) of rotation of the engine.

The electrical signals output from the crank angle sensor, the water temperature sensor 56 (the output signal of which is denoted by 56A) and the thermal type air flow sensor 24 are applied to the input of a control circuit 64 which is constituted by a microcomputer and associated circuit to be arithmetically processed, whereby the injector 12 and the ignition coil 58 are driven by the signals derived from the output of the control circuit 64.

Further disposed in the throttle chamber 4 is a bypass passage 22 communicated to the intake manifold 6 across the throttle valve 16, and a bypass valve 62 adapted to be opened or closed under control is disposed in the bypass passage 22.

The bypass valve 62 disposed in the bypass passage 22 across the throttle valve 16 is so controlled as to vary the flow section area of the bypass passage 22 in accordance with the lift of the valve 62 which in turn is actuated by a driving system controlled by a pulse current output from the control circuit 64. To this end, the control circuit 64 produces a periodic ON/OFF signal for controlling the valve driving system which in turn supplies a control signal to the associated drive unit of the bypass valve 62 for adjusting the lift or stroke thereof.

Figure 4:
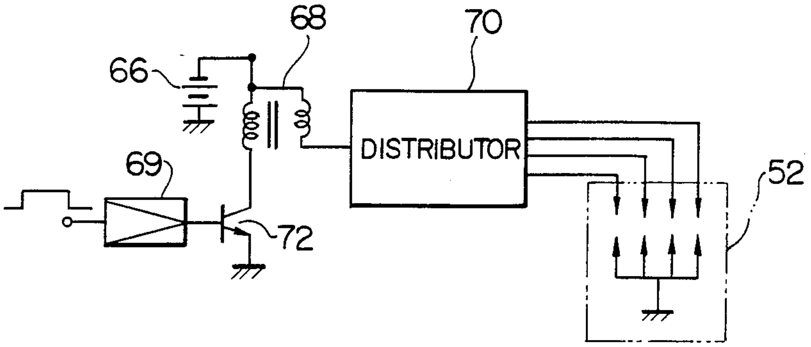
FIG. 4 shows schematically an arrangement of an ignition circuit used in combination with the control apparatus shown in FIG. 3.

Referring to FIG. 4 which shows in some detail an arrangement of an ignition system shown in FIG. 3, a pulse current is supplied to a power transistor 72 through an amplifier circuit 69, as the result of which the power transistor 72 is turned on (i.e. becomes conductive), whereby a primary current is caused to flow through a primary winding of an ignition coil 68 from a battery 66. In response to the trailing edge of the current pulse, the transistor 72 is turned off (i.e. non-conductive or blocked), to give rise to induction of a high voltage in a secondary winding of the ignition coil 68.

The high voltage thus produced is then supplied to spark plugs 52 of the individual cylinders of the internal combustion engine through a distributor 70 in synchronism with the rotation of the engine.

Figure 5:
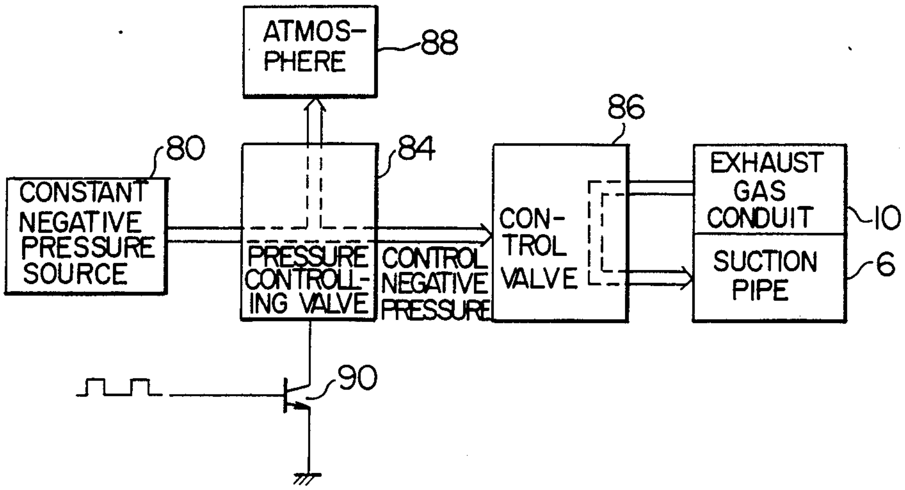
FIG. 5 illustrates an arrangement of an exhaust gas recirculating system.

FIG. 5 is a diagram to illustrate operation of an exhaust gas recirculation system (also referred to as EGR system in an abridgement). A constant negative pressure (vacuum) derived from a constant negative pressure source 80 is applied to a control valve 86 through a constant-pressure valve i.e. pressure controlling valve 84 which serves to control the ratio at which the constant negative pressure from the negative pressure source 80 is escaped to the atmosphere 88 in dependence on the duty cycle of a pulse signal applied to a transistor 90, thereby to control the negative pressure level applied to the control valve 86. In other words, the negative pressure applied to the control valve 86 is determined on the basis of the duty cycle of the transistor 90. On the other hand, the quantity of recirculated exhaust gas from an exhaust gas conduit 10 to an intake conduit or suction pipe 6 is controlled by the control negative pressure applied from the constant pressure valve 84.

Figure 6:
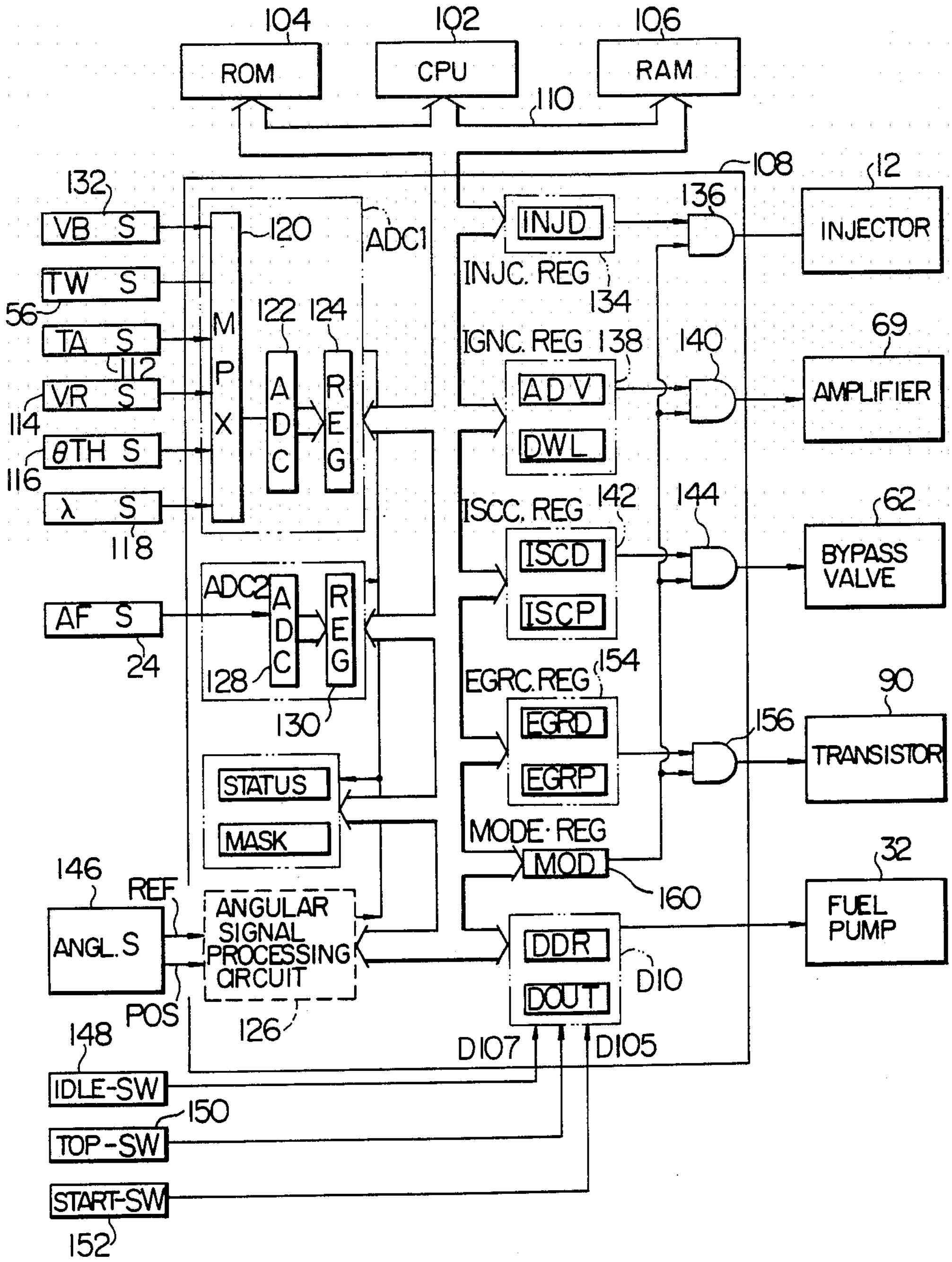
FIG. 6 shows a general arrangement of an engine control system.

FIG. 6 shows in a schematic diagram a general arrangement of a whole control system. The control system includes a central processing unit (hereinafter referred to as CPU) 102, a read-only memory (hereinafter referred to as ROM) 104, a random access memory (hereinafter referred to as RAM) 106, and an input/output interface circuit 108. The CPU 102 performs arithmetic operations for input data from the input/output circuit 108 in accordance with various programs stored in ROM 104 and feeds the results of arithmetic operation back to the input/output circuit 108. Temporary data storage as required for executing the arithmetic operations is accomplished by using the RAM 106. Various data transfers or exchanges among the CPU 102, ROM 104, RAM 106 and the input/output circuit 108 are realized through a bus line 110 composed of a data bus, a control bus and an address bus.

The input/output interface circuit 108 includes input means constituted by a first analog-to-digital converter (hereinafter referred to as ADC1), a second analog-to-digital converter (hereinafter referred to as ADC2), an angular signal processing circuit 126, and a discrete input/output circuits (hereinafter referred to as DIO) for inputting or outputting a single-bit information.

The ADC1 includes a multiplexer 120 (hereinafter referred to as MPX) which has input terminals applied with output signals from a battery voltage detecting sensor 132 (hereinafter referred to as VBS), a coolant temperature 56 for detecting temperature of cooling water (hereinafter referred to as TWS), an ambient temperature sensor 112 (hereinafter referred to as TAS), a regulated-voltage generator 114 (hereinafter referred to as VRS), a throttle angle sensor 116 for detecting a throttle angle (hereinafter referred to as θTHS) and a λ-sensor 118 (hereinafter referred to as λS). The multiplexer or MPX 162 selects one of these input signals to supply it to an analog-to-digital converter circuit 122 (hereinafter referred to as ADC). A digital signal output from the ADC 122 is held by a register 124 (hereinafter referred to as REG 124).

The output signal from the air flow sensor 24 (hereinafter referred to as AFS) is supplied to the input of ADC2 to be converted into a digital signal through an analog-to-digital converter circuit 128 (hereinafter referred to as ADC). The digital signal output from the ADC 128 is set in a register 130 (hereinafter referred to as REG 130).

An angle sensor 146 (hereinafter termed ANGS) is adapted to produce a signal representative of a standard or reference crank angle, e.g. of 180° (this signal will be hereinafter termed REF signal) and a signal representative of a minute crank angle (e.g. 1°) which signal will be hereinafter referred to as POS signal. Both of the signals REF and POS are applied to an angular signal processing circuit 126 to be shaped.

The discrete input/output circuit or DIO has inputs connected to an idle switch 148 (hereinafter referred to as IDLE-SW), a top-gear switch 150 (hereinafter termed TOP-SW) and a starter switch 152 (hereinafter referred to as START-SW).

Next, description will be made on the control operation and objects to be controlled by the pulse output circuit in dependence on the results of arithmetic operations of CPU. An injector control circuit 134 (hereinafter referred to as INJC) functions to convert the digital value representing the results of the arithmetic operation into a corresponding pulse signal. More specifically, a pulse signal having a pulse duration or width corresponding to a quantity of fuel to be injected is produced by the INJC 134 and applied to an injector denoted herein by 12 through an AND gate 136.

An ignition pulse generator circuit 138 (hereinafter referred to as IGNC) comprises a register for setting therein an ignition timing (this resistor is hereinafter referred to as ADV) and a register (hereinafter referred to as DWL) for setting therein a time point for initiating the current flow through a primary winding of the ignition coil. These data placed in the registers ADV and DWL are supplied from the CPU. The pulse signal produced on the basis of the data placed in these registers are supplied through an AND gate 140 to the amplifier 69 described hereinbefore in conjunction with FIG. 3.

The opening degree of the bypass valve 62 is controlled by a pulse signal supplied thereto from an ignition control circuit 142 (hereinafter referred to as ISCC) through an AND gate 144. To this end, the ignition control circuit ISCC 142 is composed of a register ISCD for setting therein a pulse width of pulse signal and a register ISCP for setting therein a pulse repetition rate or period.

The EGR control pulse generator circuit 154 (hereinafter referred to as FGRC) for controlling the transistor 90 which in turn controls the EGR control valve 86 shown in FIG. 4 is composed of a register EGRD for setting therein a value representative of the duty cycle of the pulse signal applied to the transistor 90 and a register EGRP for setting therein a value representative of the pulse repetition period of the same pulse signal. The output pulse from the EGRC 154 is applied to the transistor 90 through an AND gate 156.

The single-bit input/output signals are controlled by the circuit DIO. The input signals include the IDLE-SW signal, TOP-SW signal and the START-SW signal described hereinbefore. The output signal includes a pulse output signal for driving the fuel pump 32. The DIO is provided with a register DDR for determining whether the terminal thereof is to be used as the input terminal or the output terminal, and a register DOUT for latching the output data.

A register 160 (hereinafter referred to as MOD) functions to hold instructions for commanding the various inner states of the input/output circuit 108. For example, in accordance with the command set in this MOD register 160, all AND gates 136, 140, 144 and 156 are controlled in respect of the enabling and the disenabling conditions. In this manner, in accordance with the commands set in the MOD register 160, initiation as well as termination of the output signals from INJC, IGNC and ISCC can be controlled.

Figure 7:
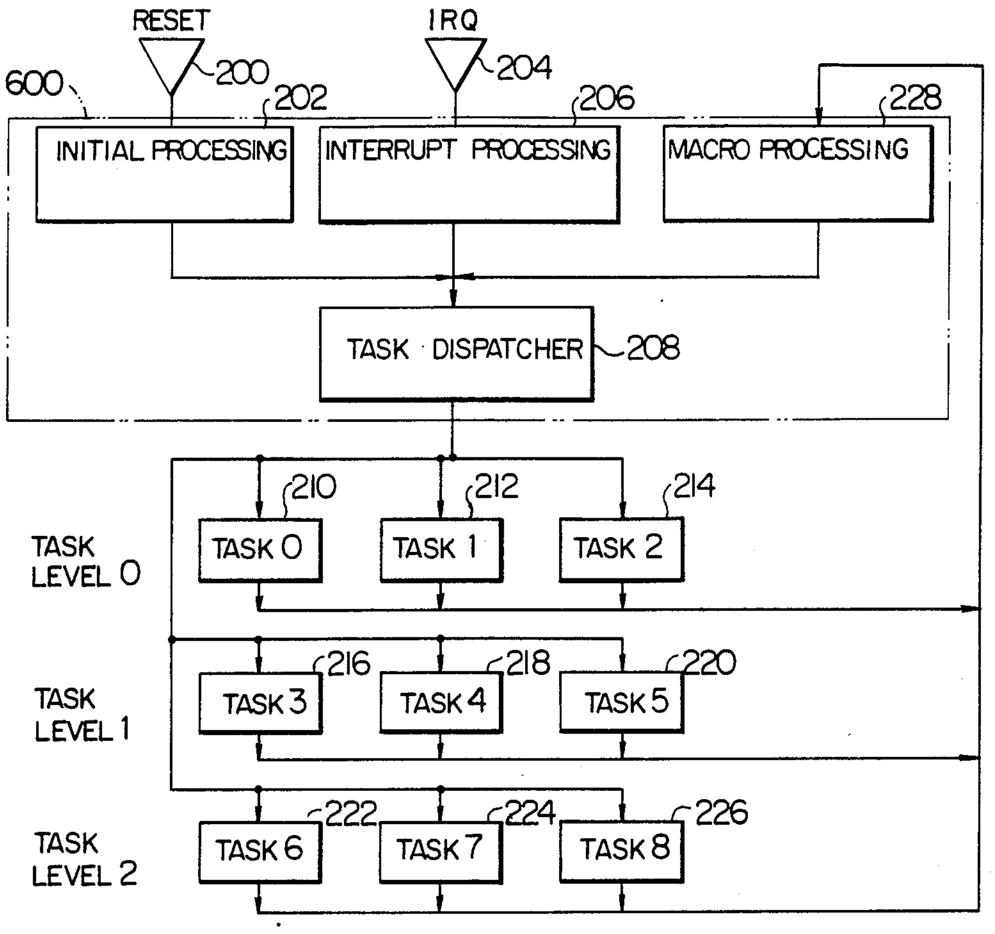
FIG. 7 is a view to illustrate a fundamental arrangement of an engine control programming system used according to the teaching of the invention.

FIG. 7 shows a fundamental arrangement of a program system for the control circuit shown in FIG. 6.

Referring to FIG. 7, an initial processing program 202, an interrupt processing program 206, a macroprocessing program 228 and a task dispatcher 208 are management programs for managing or controlling a group of tasks. The initial processing program 202 serves to make preparation for actuating the microcomputer. For example, this program 202 manages clearing of contents in the RAM 106, initialization of the registers provided in the input/output interface circuit 108 and fetching of input data or information such as the coolant temperature $T_W$, the battery voltage and the like which are required for making preparation for the engine control. The interrupt processing program 206 receives various interrupts and analyzes requesting sources or origins of the interrupts to thereby issues an activation request to the task dispatcher 208 for activating the required task among the group of tasks 210 to 226. These interrupts include an A/D conversion interrupt (hereinafter referred to as ADC) produced after A/D conversion of the input information about the source voltage, coolant temperature and the like, an initial interrupt (also referred to as INTL) produced in synchronism with rotation of the engine, an interval interrupt (also referred to as INTV) issued at every predetermined time point, say at every 10 ms, an engine stop interrupt (also referred to as ENST) produced upon detection of the stopped state of the engine and others, as will be described hereinafter.

Each of the tasks 210 to 226 is allotted with a task number representative of the priority order. The tasks 210 to 226 belong to one of task subgroups having task levels 0 (zero) to 2, respectively. In more particular, the tasks No. 0 to No. 2 belong to the task level 0, the tasks Nos. 3 to 5 belong to the task level 1 and the tasks Nos. 6 to 8 belongs to the task level 2.

The task dispatcher 208 receives activation requests for the various interrupts described hereinbefore and allows them to occupy the CPU on the basis of the priority or preference order attached to the various interrupts corresponding to the activation requests.

The priority interrupt control of the tasks performed by the task dispatcher 208 is based on the following rules:

(1) Transfer of task execution to the task allotted with a higher priority by interrupting the task of a lower priority is effected only between the task levels. In this connection, it is assumed that the task level 0 (zero) is assigned with the highest priority.

(2) When a task is being executed or interrupted in one of the task levels, this task has the highest priority, whereby other tasks belonging to the same task level are not allowed to be executed until the execution of the task having the highest priority has been completed.

(3) When activation requests are issued to a plurality of the tasks belonging to one and the same task level, the task attached with the least significant task number (No.) is deemed to have the highest priority and vice versa.

Details of the processings executed by the task dispatcher 208 will be described hereinafter. It should however be mentioned hereat that a soft timer is provided in the RAM 106 for each of the tasks for performing the priority control mentioned above and that a control block for managing the tasks on the task-level base is also provided in the RAM 106. Upon completion of any one of the tasks mentioned above, the macroprocessing program 228 informs the task dispatcher 208 of the completed execution of that task.

Figures 8, 9:
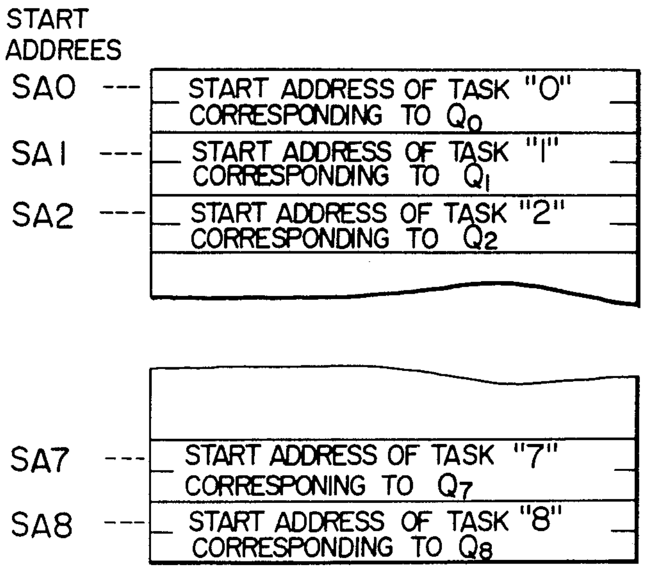
FIG. 8 shows a table of task control blocks stored in a random access memory or RAM managed by a task dispatcher.
FIG. 9 is a view illusting a start address table for a group of tasks activated by various interrupts.

Next, description will be made on the processings executed by the task dispatcher 208 by referring to FIGS. 8 to 14. FIG. 8 shows the task control blocks provided in the RAM managed by the task dispatcher 208. The number of the task blocks as provided corresponds to the number of the task levels. Accordingly, in the case of the illustrated embodiment, three control blocks are provided for the three task levels 0 to 2, respectively. Each of the control blocks is allotted with eight bits, along which the zeroth to the second bits ($Q_0$ to $Q_2$) are used as activation bits representative of the task to which the activation request is issued. On the other hand, the seventh bit (R) serves as an execution bit indicating that a given one of the tasks belonging to the same task level is being executed or interrupted. The activation bits $Q_0$ to $Q_2$ are arrayed in the order of the high to low priorities in each of the task levels. For example, the activation bit corresponding to the task No. 4 shown in FIG. 7 is the bit $Q_0$ of the task level 1. When a task activating request makes appearance, a flag is set at a corresponding one of the activation bits. On the other hand, the task dispatcher 208 searches the issued activation requests in the order of the activation bits corresponding to the tasks of the higher to the lower levels, and resets the flag corresponding to the activation request as issued, while setting the flag 1 at the execution bit, to thereby perform the processing required for the activation of the task in concern.

FIG. 9 shows a start address table provided in RAM 106 supervised or managed by the task dispatcher 208. The start addresses SA0 to SA8 are for the tasks Nos. 0 to 8 among the group of tasks 210 to 226. Each of the start address information is assigned with 16 bits and utilized by the dispatcher 208 for activating the task to which the activation request is issued, as will be described hereinafter.

Figure 10:
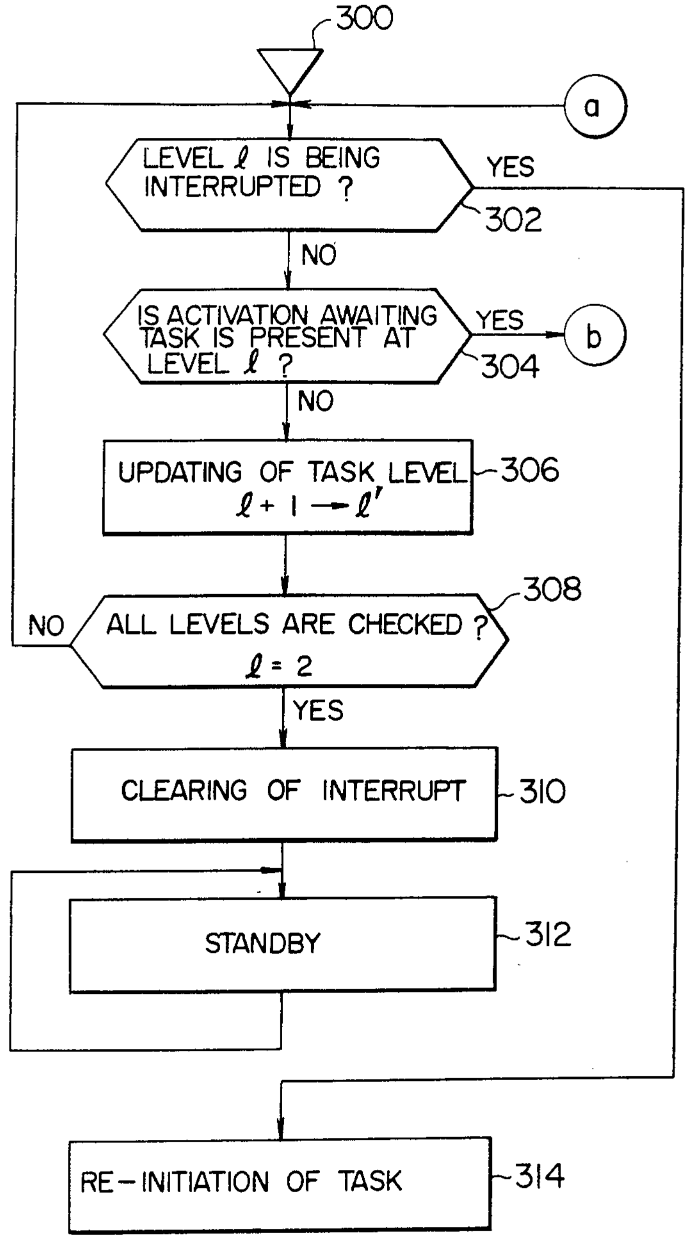
FIGS. 10 and 11 illustrate in flow charts flows of processings executed by the task dispatcher.
Figure 11:
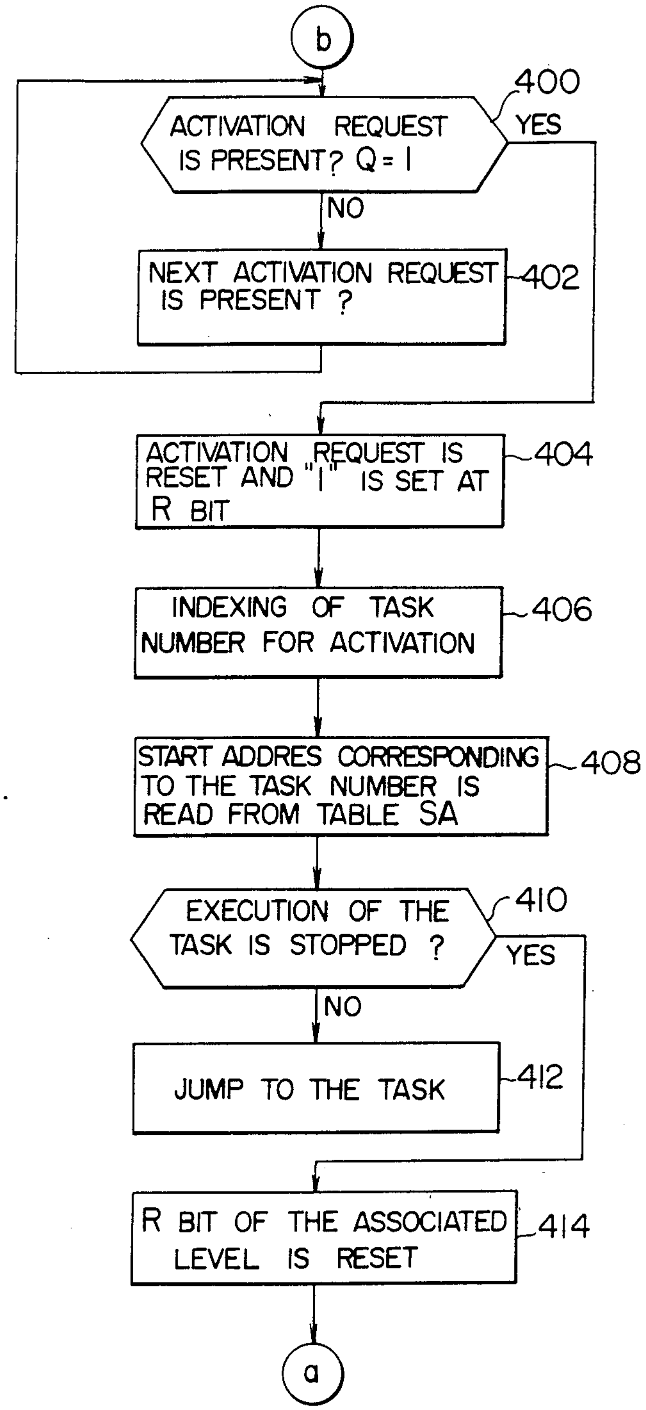

FIG. 10 and 11 illustrate flows of the processings executed by the task dispatcher. Referring first to FIG. 10, the processing of the task dispatcher 302 is initiated at a step 300. Then, at a step 302, it is decided whether the task belonging to a certain task level l is being executed or interrupted. In more particular, when the flag "1" is set at the execution bit, this means that the message of completed execution of the task is not yet issued to the task dispatcher 208 by the macro-processing program 228 and that the task as executed is now in the interrupted state due to the occurrence of the interrupt request allotted with a higher priority. When the flag "1" is set at the execution bit, jump is made to a step 314, whereby the task having being interrupted is initiated again.

On the other hand, in case the flag "1" is not set at the execution bit, i.e. when the execution indicating flag is reset, it is determined whether or not an activation awaiting task of the level l is present. In other words, the activation bits of the level l are retrieved in the priority order of the corresponding tasks, i.e. in the order of $Q_0$, $Q_1$ and $Q_2$ in the case of the illustrated embodiment. Unless the flag "1" is not set at the activation bit belonging to the task level l, updating of the task level is carried out at a step 306. In other words, the task level l is incremented to $(l+1)$. After the task level has been updated at the step 306, it is then determined at a next step 308 whether or not all the task levels have been checked. Otherwise (i.e. unless l =2), the step 302 is regained and the processing is repeated in accordance with the procedure mentioned above. On the contrary, when it is found at the step 308 that all the task levels have been checked, then clearing or resetting of the interrupt is effected at a step 310. It should be noted that any interrupt is inhibited during a period in which the processings at the steps 302 to 308 is being executed. Accordingly, the clearing or resetting of the interrupt can be effected at the step 310. At a next step 312, another interrupt request is awaited.

When it is determined at the step 304 that the activation awaiting task of the level l is present, i.e. when the flag "1" is set at the activation bit belonging to the task level l, then execution is transferred to a step 400. Through a loop including steps 400 and 402, the activation bit of the level l at which the flag "1" is set is searched in the priority order, i.e. in the order of the bits $Q_0$, $Q_1$ and $Q_2$. When the corresponding activation bit is indexed, the flag set at that activation bit is reset at a step 404, while a flag "1" is set at the execution bit (hereinafter referred to as R bit) of the corresponding task level l. Further, at a step 406, the identifying number of the task to be activated is searched, which is followed by a step 408 where the start address of the task to be activated is read out from the start address table provided in RAM and shown in FIG. 9.

Next, it is determined at a step 410 whether the task as activated is to be executed or not. In this connection, when the start address information as read out has a specific value, say "0", it is decided that the corresponding task is not to be executed. This decision step 410 is required for executing only the task among the engine controlling tasks that is specifically and selectively provided in dependence on the specific type of the motor vehicles to be equipped with the engine control system according to the invention. When it is decided at the step 410 that the execution of the task in concern is to be stopped, then the R bit of the corresponding task level l is reset at a step 414, and the step 302 is regained to determine whether the task of the level l is being interrupted or not. Since the flag may possibly be set at a plurality of the activation bits of the same task l, arrangement is made such that the step 302 is regained after the R bit is reset at the step 414.

On the other hand, when it is decided that the execution of the task in concern is to be executed, a jump is made to the task for the execution thereof.

Figure 12:
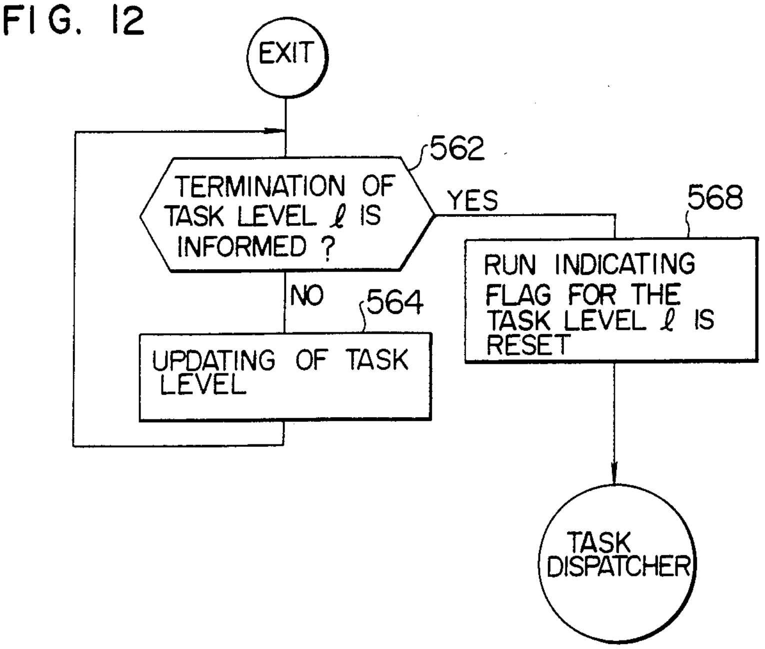
FIG. 12 illustrates a processing flow of a micro-processing program.

FIG. 12 illustrates a processing flow of the macro-processing program 228. This program is composed of steps 562 and 564 for identifying the ended task. At the steps 562 and 564, retrieval is made successively starting from the task of level "0" to identify the task level of the ended task. At the next step 568, the flag R set at the seventh bit of the task control block corresponding to the ended task is reset, which means that the program for the identified task has been completely terminated. The processing is taken back again by the task dispatcher 208, whereby the task next to be executed is determined.

Next, referring to FIG. 13, description will be made on the manner in which the task is executed or interrupted under the priority control of the task dispatcher 203. It is assumed that m of a symbol Nmn identifying the activation request for the tasks represents the task level, while n represents the degree of the priority at the task level m. Further, it is assumed that the CPU is executing a supervisory or management program OS. When an activation request $N_{21}$ is issued during the running of the supervisory program OS, execution of the task corresponding to the activation request $N_{21}$, i.e. the task No. 6 is initiated at a time point $T_1$. When an activation request $N_{01}$ for the task allotted with a higher prority is issued at a time point $T_2$ in the course of the execution of the task No. 6, then supervisory program OS is re-initiated to perform the predetermined processing described hereinbefore and subsequently the task corresponding to the activation request $N_{01}$, i.e. the task No. 0 begins to be executed at a time point $T_3$. When another activation request $N_{11}$ makes appearance in the course of the execution of the task No. 0 at a time point $T_4$, the supervisory or management program OS is regained to perform the predetermined processing and subsequently execution of the task No. 0 being interrupted is restored at a time point $T_5$. Upon completion of execution of the task No. 0 at a time point $T_6$, the supervisory program OS becomes effective once more, whereby the completed execution of the task No. 0 is informed to the task dispatcher 208 by the macroprocessing program 228. Thereafter, the task No. 3 corresponding to the activation request $N_{11}$ in queue is executed starting from a time point $T_7$. In case an activation request $N_{12}$ belonging to the same task level 1 and assigned with a lower priority is issued at a time point $T_8$ when the task 3 is being executed, the execution of the task No. 3 is stopped and the supervisory program OS is restored to perform the predetermined processing. Subsequently, execution of the task No. 3 is re-initiated at a time point $T_9$. When execution of the task 3 comes to an end at a time point $T_{10}$, the supervisory program OS is executed by the CPU, whereby the completed execution of the task No. 3 is informed to the task dispatcher 208 through the macro-processing program 228. At a time point $T_{11}$, the task No. 4 corresponding to the activation request of a lower priority begins to be executed. When the task No. 4 have been executed at a time point $T_{12}$, the supervisory program OS is rendered effective to perform the predetermined processing and subsequently execution of the task No. 6 corresponding to the activation request $N_{21}$ and interrupted until then is now initiated again.

In this manner, the priority control of the various tasks is effected.

The manner in which the tasks of different levels are executed in accordance with the procedures described above is illustrated in FIG. 14. In a standby state labelled by IDLE, no request to activate the task is issued. When the activation request is generated, a flag "1" is set at the activation bit of the task control block to indicate the necessity of activation. The time duration required for the shift from the state IDLE to QUEUE is determined in dependence on the level of the task to which the activation request is issued. In the state QUEUE, the sequence or order of execution is determined in accordance with the priority allotted to the task. In order to execute the task in concern, the flag at the activation bit of the task control block has to be beforehand cleared while the flag must be set at the R bit (the seventh bit) by the task dispatcher 208 of the supervisory program OS. The state in which the task is executed is represented by RUN in FIG. 14. Upon termination of execution, the flag at the R bit of the task control block is cleared to indicate the completed execution of the task. The state RUN is now replaced by the state IDLW for awaiting a next activation request. When an interrupt request or IRQ is issued during execution or RUN of the task, the latter has to be interrupted. To this end, the contents present at that time in CPU is set aside at a standby area. This state is indicated by a label READY. When the interrupted task is to be executed again, the contents in the standby area is fed back again to CPU. In other words, the state READY is changed over again to the state RUN. In this manner, each of the tasks may take repeatedly the four states shown in FIG. 14. The flow shown in FIG. 14 is a typical one. It may happen that a flag "1" is set at the activation bit of the task control block in the state READY. For example, this is the case in which a next activation request makes appearance to the very task that is being interrupted. Under the situation, the flag set at the R bit is allotted with a higher preference, whereby the task being interrupted is first executed to an end. When the flag at the R bit is reset, the just executed task is shifted directly to the state QUEUE without taking the state IDLE by the flag set at the activation bit.

As will be appreciated from the foregoing description, the tasks Nos. 0 to 8 take necessarily one of the states illustrated in FIG. 14.

Figure 15:
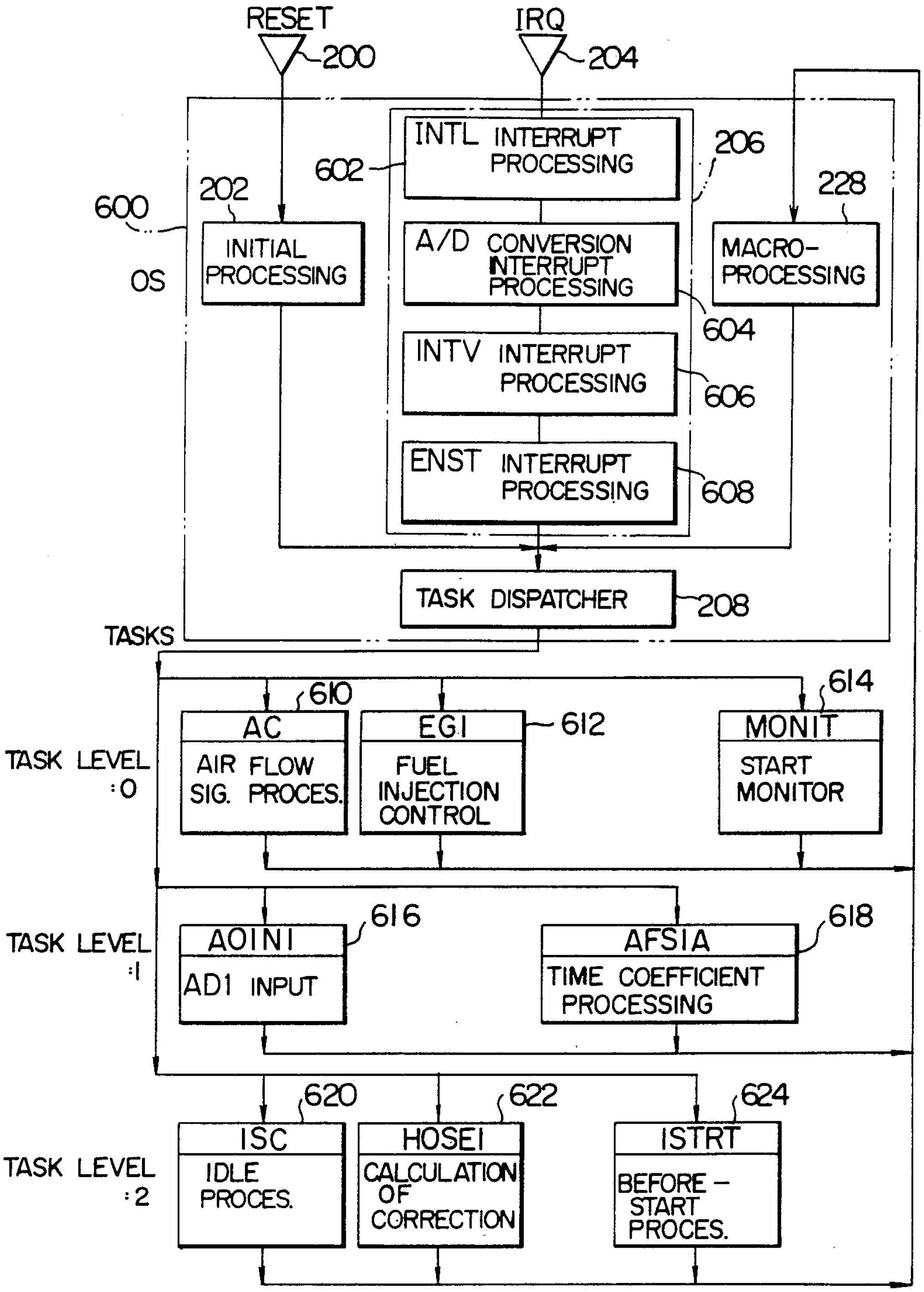
FIG. 15 is a view illustrating in more concrete from the flows of processings in the program system shown in FIG. 7.

FIG. 15 illustrates a concrete example of the program system shown in FIG. 7. Referring to FIG. 15, the supervisory or management program OS comprises the initial processing program 202, the interrupt processing program 206, the task dispatcher 208 and the macroprocessing program 228.

The interrupt processing program 206 is composed of various interrupt processing programs. In the case of the initial interrupt processing 602 (hereinafter referred to as INTL interrupt processing), a number of initial interrupts which corresponds to a half of the number of engine cylinders are produced for every rotation of the engine. Thus, in the case of a four-cylinder internal combustion engine, the initial interrupt is generated twice during a single rotation of the engine. In response to the initial interrupt, the fuel injection time arithmetically determined by the EGI task 612 is loaded in an EGI register of the input/output interface circuit 108. There are two types of A/D conversion interrupt processings 604. One is the interrupt of the converter ADC 1 (this interrupt will be hereinafter referred to as ADC 1 interrupt). The other is the interrupt of the converter ADC 2 (hereinafter referred to as ADC 2 interrupt). The converter ADC 1 has a precision corresponding to 8 bits and is used for receiving at inputs those signals which represent the power source voltage, temperature of cooling water, temperature of intake air, regulations as effected and the like, respectively, as described hereinbefore (FIG. 6). The converter ADC 1 designates input points to the multiplexer 120 and initiates simultaneously the A/D conversion of the signals mentioned above. After the completed conversion, the ADC 1 interrupt request is issued by the converter ADC 1. It should be noted that this interrupt is made use of only before the cranking (i.e. in the starting phase). Further, the converter 128 of the ADC 2 is supplied with an input signal representative of the intake air flow. After the A/D conversion of this signal, the ADC 2 interrupt is issued. This ADC 2 interrupt also is made use of only in the cranking (i.e. in the engine starting phase).

In an interval interrupt processing program (hereinafter referred to as INTV interrupt processing program) 606, the interval interrupt signal is periodically produced at a time interval (e.g. 10 ms) set at the INTV register and utilized as a base signal for monitoring the timing of the tasks to be activated with respective predetermined periods. This interrupt signal serves to update the soft timer and activate the task which has come up to the predetermined time point to be activated. Further, in an engine stop interrupt processing program 608 (hereinafter referred to as the ENST interrppt processing program), the stopped state of the engine is detected. Upon detection of the INTL interrupt signal, a clock counting operation is initiated, resulting in that the ENST interrupt is issued unless another INTL interrupt signal is detected within a predetermined duration, say 1 sec. Unless the INTL interrupt signal is detected during a period in which the ENST interrupt is issued three times, e.g. within 3 sec., it is determined that the stoppage of the engine takes place to thereby stop the power supply to the ignition coil as well as the operation of the fuel pump. After these processing, the turning-on of the starter switch 152 is awaited. Processings effected for the various interrupt requests described in the foregoing are summarized in the following table 1.

TABLE 1

PROCESSINGS OF INTERRUPTS

| Identification of Interrupts | Contents of Processing |
|---|---|
| INTL | Setting of fuel injection time at EGI register |
| ADC 1 | Activation of task ADIN 1 |
| ADC 2 | Activations of air flow signal processing task as well as periodically activated tasks ADIN 2 and EGI. |
| INTV | Activation timings of MONIT, ADIN 1, AFSIA, ISC are checked to activate the tasks at the respective predetermined timings. |
| ENST | ENST processing is executed. Initialization is effected. |

The initial processing program 202 and the macroprocessing program 228 are executed in the manner described above.

The tasks activated by the various interrupts described above are as follows: an air flow signal processing task (hereinafter referred to as AS task), a fuel injection control task (hereinafter referred to as EGI task) and a start monitor task (hereinafter referred to as MONIT task), all belonging to the task level "0; an ADC 1 inputting task (hereinafter referred to as ADIN 1 task) and a time factor processing task (hereinafter referred to as AFSIA task), both belonging to the task level 1; and an idle rotation control task (hereinafter referred to as ISC), a correction calculating task (hereinafter referred to as HOSEI task) and a start preparation processing task (hereinafter referred to as ISTRT task), all belonging to the task level 2.

Allocation of the task levels and functions of the individual tasks are summarized in the following TABLE 2.

TABLE 2

| ALLOCATION OF TASK LEVELS AND FUNCTIONS OF TASKS | | | | |
|---|---|---|---|---|
| Level | Identification of programs | Task Nos. | Functions | Activation periods |
| 0 | OS | | Control of engine rotation interrupt. | 5 ms (at minimum) |
| 1 | | | Other processings by OS. | |
| 0 | AC | 0 | Inhibition of fetching v, calculation of $(v)^2$ and integration/averaging of $(v)^2$. Control of acceleration. Cut-off of fuel supply. | 10 ms |
| 0 | EGI | 1 | Control of fuel injection time. Regulation of CO. | 20 ms |
| | MONIT | 3 | Monitoring of starter switch (OFF). Control of fuel injection time in start phase. Trigger and stop of soft timer. | 40 ms |
| 1 | ADIN 1 | 4 | Inputting to A/D converter, correction and filtering. | 50 ms |
| | AFSIA | 6 | Controls of after-start, after-idle and after-acceleration time factors. | 120 ms |
| 2 | ISC | 8 | Control of idling rotation frequency. | 200 ms |
| 2 | HOSEI | 9 | Calculation of correcting coefficients. | 300 ms |
| | ISTRT | 11 | Calculation of initial value of EGI. Monitoring of starter switch (ON). Trigger and stop of soft timer. Activation of fuel pump, 1/OLSI. | 30 ms |

As can be seen from the TABLE 2, the periods for activation of the various tasks in response to the various interrupt requests are previously determined, and information of these periods are stored in a read-only memory or ROM 104.

Figure 16:
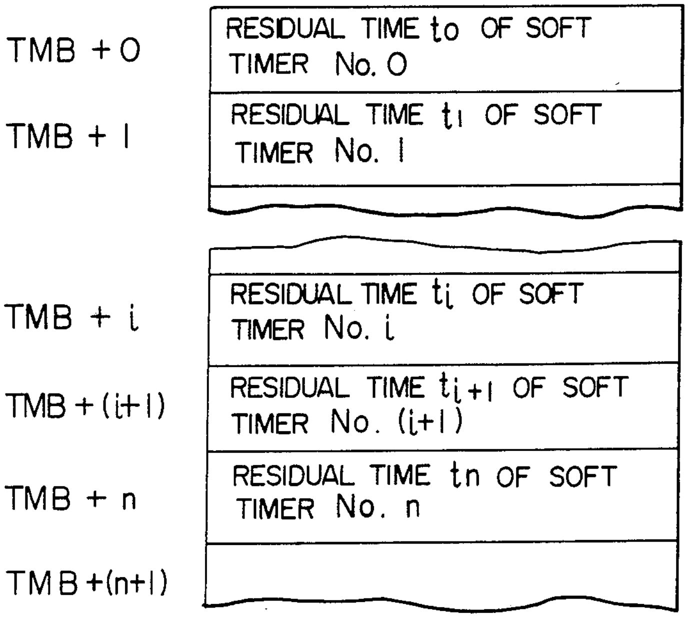
FIG. 16 is a view showing a soft timer table in the RAM.
Figure 19:
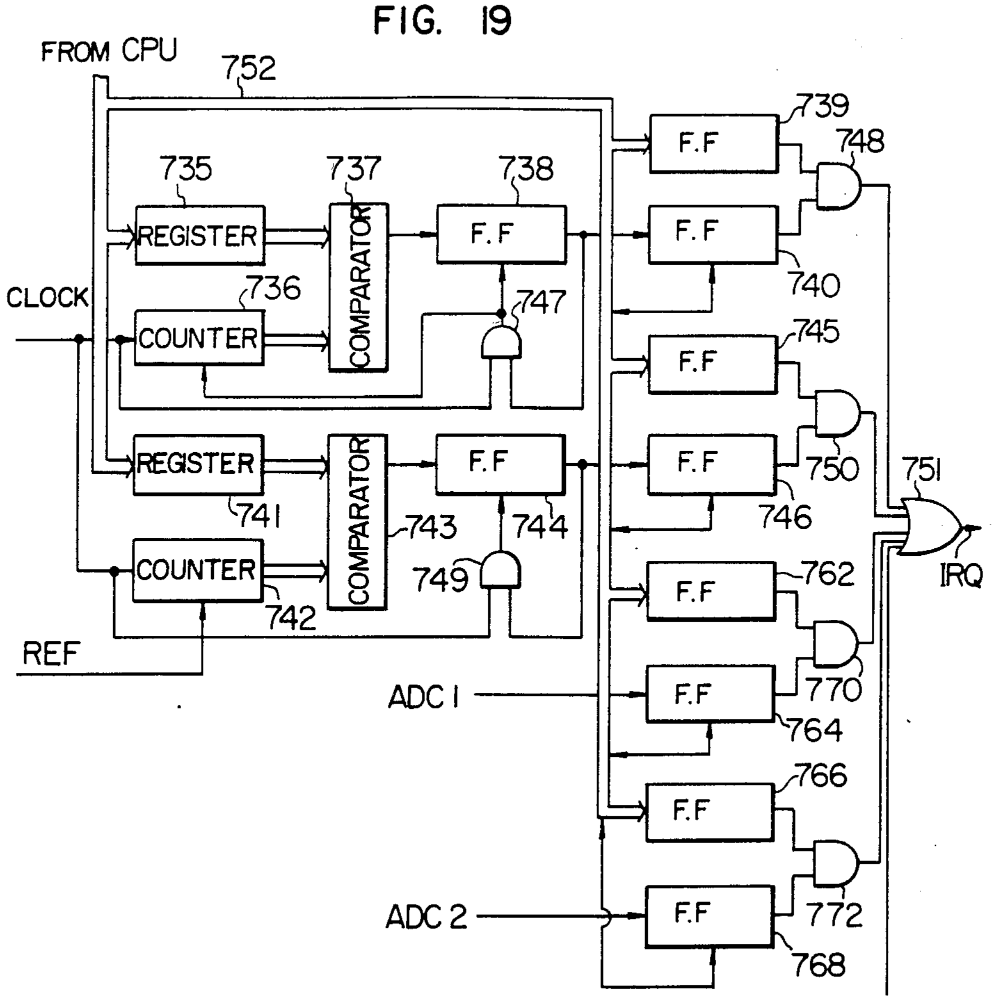
FIG. 19 shows schematically a circuit diagram of an interrupt request generating circuit.

Next, processing of the INTV interrupt will be elucidated by referring to FIGS. 16 to 19. FIG. 19 shows a soft timer table provided in the RAM 106. The soft timer table includes timer blocks in a number which corresponds to the number of the different activation periods for the tasks activated by the various interrupts. With the terms "timer block", it is intended to mean storage areas to which time information about the activation periods of various tasks stored in the ROM 104 is transferred. In FIG. 16, symbols TMB+O and so forth inserted on the left side of the soft timer table designate leading addresses of the soft timer table provided in the RAM 106. Each of the timer blocks of the soft timer table is loaded with the time information about the activation periods mentioned above as transferred from the ROM 104. To this end, when the INTV interrupt is to be effected for every 10 ms, for example, an integral multiple thereof is transferred and stored in the associated timer block.

Figure 17:
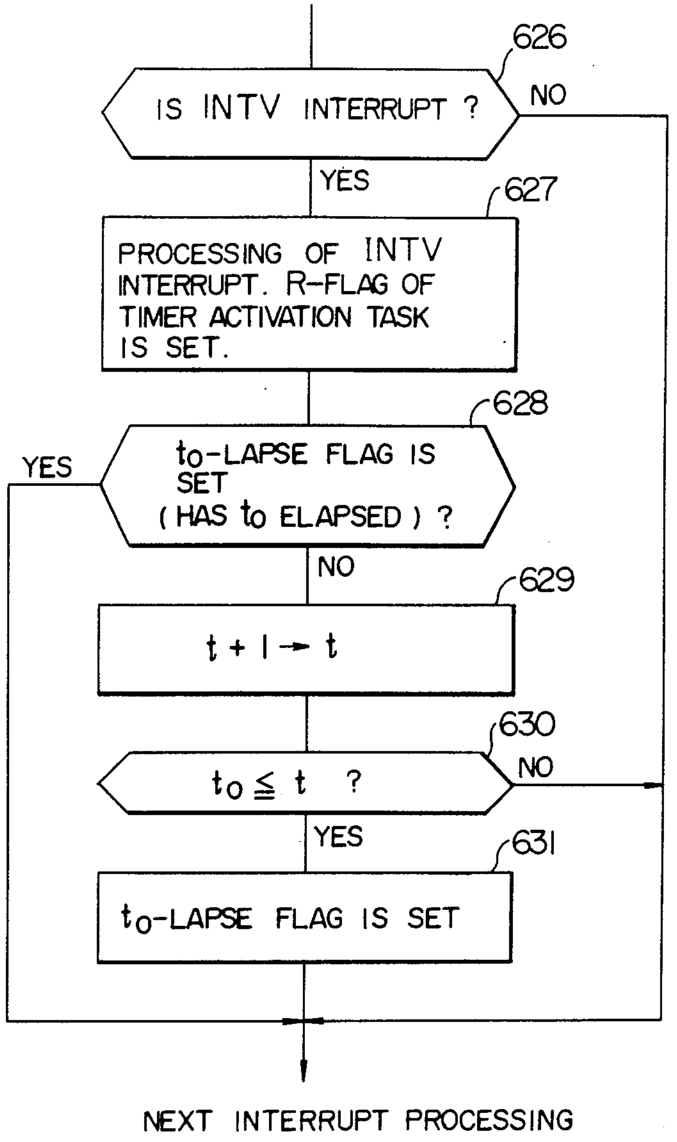
FIG. 17 shows in a flow chart a time measuring routine activated by an INTV interrupt adopted in the system according to the invention.
Figure 18:
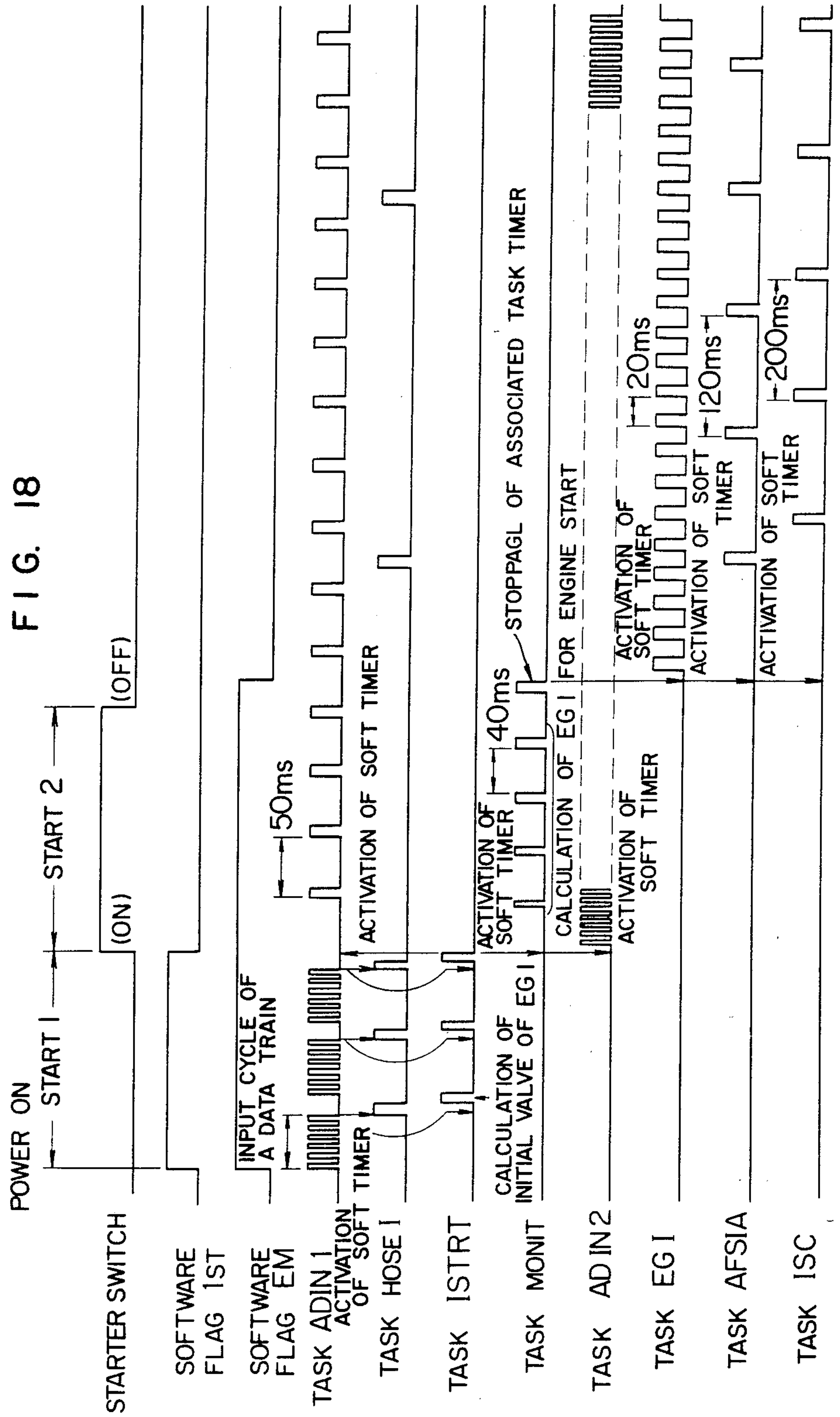
FIG. 18 shows a timing chart to illustrate manners in which activations of various tasks are stopped in dependence of operating states of an internal combustion engine equipped with the engine control apparatus according to the invention.

FIG. 17 shows a flow of the INTV interrupt processing for effecting the time measurement by making use of the INTV interrupt. Referring to this figure, when the interrupt processing program is activated, decision is make at a step 626 as to whether the INTV interrupt is requested or not. If the result of the decision is negative (i.e. NO), the program proceeds to the processing of another succeeding interrupt request. When it is determined at the step 626 that the INTV interrupt is requested, not only the routine INTV interrupt processing but also the processing concerning the lapse of time are carried out at a step 627. To this end, a flag Q representative of the timer starting task is set. Next, at a step 628, it is determined whether or not a predetermined time $t_o$ has elapsed. To this end, it is determined whether a $t_o$-lapse flag indicating that the predetermined time $t_o$ has elasped is set or not. When the result of the determination step 628 is affirmative, i.e. when it is found that the $t_o$-lapse flag is set, the program proceeds to a succeeding interrupt processing. On the other hand, when it is found at the step 628 that the $t_o$-lapse flag is not set, then the timer content t is incremented by 1 (one) to be $(t+1)$ which is subsequently subjected to comparison at a step 630 to determine whether $(t+1)$ is equal to the predetermined time $t_o$. If the result of the comparison step 630 is negative (i.e. NO), the program proceeds to a succeeding interrupt processing. On the other hand, when the result of the comparison step 630 shows that $(t+1) \geqq t_o$, the $t_o$-lapse flag representative of the laspe of the predetermined time $t_o$ is set at a step 631. Thereafter, the program proceeds to the processing of next interrupt request.

In this manner, there are issued activation requests for the tasks in association with the various interrupts, whereby the tasks are executed. It is however to be noted that the tasks listed in the Table 2 are not always executed, but the time information concerning the activation periods of these tasks stored in the ROM 104 is selectively transferred to the soft timer table reserved in the RAM 106 in dependence on the information or parameters concerning the engine operation. When the activation period of a given task is, for example, 20 ms, the task is activated at every 20 ms. When a task is of the kind to be successively activated in dependence on the engine operating conditions, the content in the soft timer table corresponding to that task is updated and initialized. Next, referring to FIG. 8, manners in which activations of tasks are stopped by various interrupts in dependence on the operating conditions of the engine will be elucidated. When the starter switch 152 is turned on, the CPU is actuated, whereby software flags IST and EM are set to "1". The software flag IST serves to indicate that operation of the engine is in the state not yet stated, while the software flag EM serves to inhibit the ENST interrupt. Accordingly, it is possible with the aid of both of these flags IST and EM to determine whether the engine is in the state not yet started or in the state being started or in the started state. In response to the closing of the starter switch 152, the task ADIN 1 is first activated to allow the data such as information of the temperature of engine cooling water, battery voltage and the like required for the engine starting operation to be fetched from the respective sensors and supplied through the multiplexer 120 to the A/D converter 122. Every time these information signals have been fetched in a cyclical routine, the correction task HOSEI is activated, as the result of which calculation for correction is effected on the basis of the input information mentioned above. Further, when the data signals derived from the various sensors have been inputted to the A/D converter 122 through execution of the task ADIN 1 in the cyclical routine, the task ISTRT is activated to calculate the fuel injection quantity required for the engine starting operation. These three tasks ADIN 1, HOSEI and ISTRT are activated by the initial processing program 202.

Upon turning-on of the starter switch 125, activation of the tasks ADIN 1, MONIT and ADIN 2 is brought about by the interrupt signal of the task ISTRT. These three tasks are required to be executed only during a period in which the starter switch 152 is turned on, i.e. only during the cranking or starting phase of the engine operation. During this period, the time information of the predetermined activation periods corresponding, respectively, to these tasks is transferred from the ROM 104 to the soft timer table preserved in the RAM 106 to be stored therein. To this end, residual time $T_1$ of the activation periods remaining in the soft timer table is cleared, whereby the activation periods as transferred from the ROM 104 are repeatedly set at the soft timer table. The task MONIT is destined for calculation of the fuel injection quantity required for the starting operation of the engine. Since execution of this task MONIT is no more required once the engine operation has been started, operation of the associated soft timer is inhibited, when the task MONIT has been executed predetermined number of times. Upon termination of the task MONIT, a stop or termination signal is produced to activate other tasks which are to be executed after the starting of the engine. When a given task is to be terminated by the soft timer, the content of the soft timer is cleared by a task termination indicating signal which is produced at a time point at which a decision is made to the effect that execution of said task is completed, to thereby terminate that task. By virtue of such arrangement that the activation and termination of the task are realized in a simplified manner by using the soft timer as described above, it is possible to supervise a plurality of tasks having different activation periods with a high efficiency and an enhanced reliability.

FIG. 19 shows a circuit configuration for generating the interrupt requests (hereinafter referred to simply as IRQ). Referring to this figure, a register 735, a counter 736, a comparator 737 and a flip-flop 738 constitute a circuit for generating the INTV IRQ. The register 735 is loaded with data concerning the period for generating the INTV IRQ which is assumed to be 10 ms in the case of the illustrated embodiment. A clock pulse signal is supplied to the counter 736. When the count content in the counter 736 coincides with the content stored in the register 735, the flip-flop 738 is set, in response to which the counter 736 is cleared and caused to initiate again the counting operation. Thus, the INTV IRQ is generated for every predetermined time or period (e.g. 10 ms).

A register 741, a counter 742, a comparator 743 and a flip-flop 744 constitute an ENST IRQ generating circuit for detecting stoppage of the engine. The register 741, the counter 742 and the comparator 743 serve to the functions similar to those described above, whereby the ENST IRQ is produced upon coincidence between the count content of the counter 742 and the content set in the register 741. It should be noted that the ENST IRQ can never be generated so long as the engine is rotated, because the count content of the counter 742 is cleared by the REF pulse signal produced at every predetermined crank angle by the crank angle sensor and thus can not attain the value set in the register 741.

The INTV IRQ produced by the flip-flop 738, the ENST IRQ produced by the flip-flop 744 as well as IRQ's originating from the ADC 1 and ADC 2 are set to flip-flops 740, 746, 764 and 768, respectively. On the other hand, there are placed in flip-flops 737, 745, 762 and 766 those signals which serve to render the IRQ's mentioned above to be valid or invalid. When the flip-flops 737, 745, 762 and 766 are set to the state of high level "H", AND gates 748, 750, 770 and 772 are enabled to allow the IRQ's to be issued through an OR gate 751.

In this manner, generation of the IRQ's can be selectively inhibited or permitted by setting the flip-flops 737, 745, 762 and 766 to the high "H" or low "L" level state. Further, by inputting the state signals outputted from the flip-flops 740, 746, 764 and 768 to the CPU, the causes or origins of the issued IRQ's can be determined.

When the CPU initiates execution of a program in response to a given IRQ signal as issued, the latter has to be cleared by resetting the associated one of the flip-flops 740, 746, 764 and 768.

Figure 20:
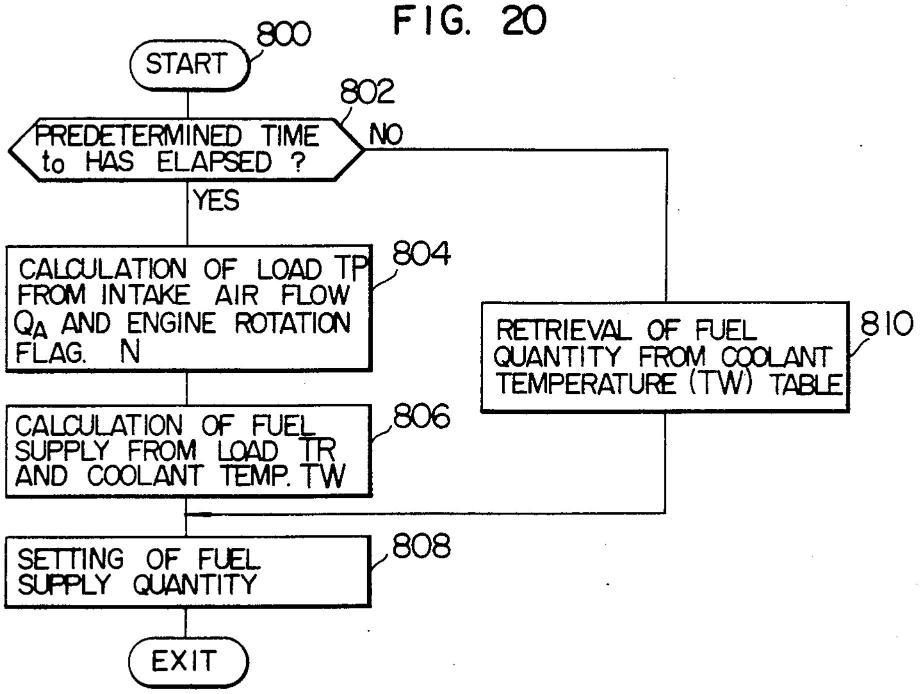
FIG. 20 shows a flow chart illustrating control operation of the fuel supply to the engine in the engine starting phase according to an exemplary embodiment of the invention.

When the INTV interrupt is issued and unless the predetermined time $t_o$ has elapsed since the INTV interrupt, the fuel injection time control effected by the engine start monitor 614 shown in FIG. 15 is carried out in a manner illustrated by a processing flow shown in FIG. 20. The processing illustrated in FIG. 20 is a task belonging to the task level "0" as can be seen from FIG. 15 (refer to the engine start monitor 614) and executed repeatedly with a predetermined time interval. When the task of the engine start monitor 614 is initiated at a step 802, it is determined at a step 802 whether the flag representing that the predetermined time $t_o$ has elaped since the turn-on of the key switch is set or not. When the $t_o$-lapse flag is set, load TP of the engine is arithmetically determined at a next step 804 on the basis of the intake air quantity $Q_A$ and the rotation number N of the engine in accordance with a well known expression; $TP=k\cdot Q_A/N$ where k represents a proportional constant. When the engine load TP is thus determined at the step 804, fuel supply quantity is arithmetically determined at a succeeding step 806 on the basis of the engine load TP with the data of engine cooling water temperature TW being utilized as a correcting factor. More specifically, the correcting factors or coefficients are previously experimentally determined for different temperatures of engine cooling water and stored in the form of a correcting factor table in the ROM 102. Thus, the correcting coefficient corresponding to the detected water temperature TW is read out from the memory and utilized to determine the optimum fuel supply quantity by multiplying the engine load TP with the correcting coefficient as read out. The fuel supply quantity thus correctively determined is then loaded in the register 134 of the input/output circuit (refer to FIG. 6) at a step 808. On the other hand, when the decision made at the step 802 has proved that the $t_o$-lapse flag is not set, i.e. the predetermined time $t_o$ has not yet elapsed, the fuel supply quantity is then determined at a step 810 with the aid of data available from a fuel supply quantity table which is previously prepared in dependence on the temperature TW of engine cooling water and stored in the ROM 102. The fuel supply quantity thus determined is loaded in the register 134 of the I/O circuit shown in FIG. 6 at the step 808.

Figure 21:
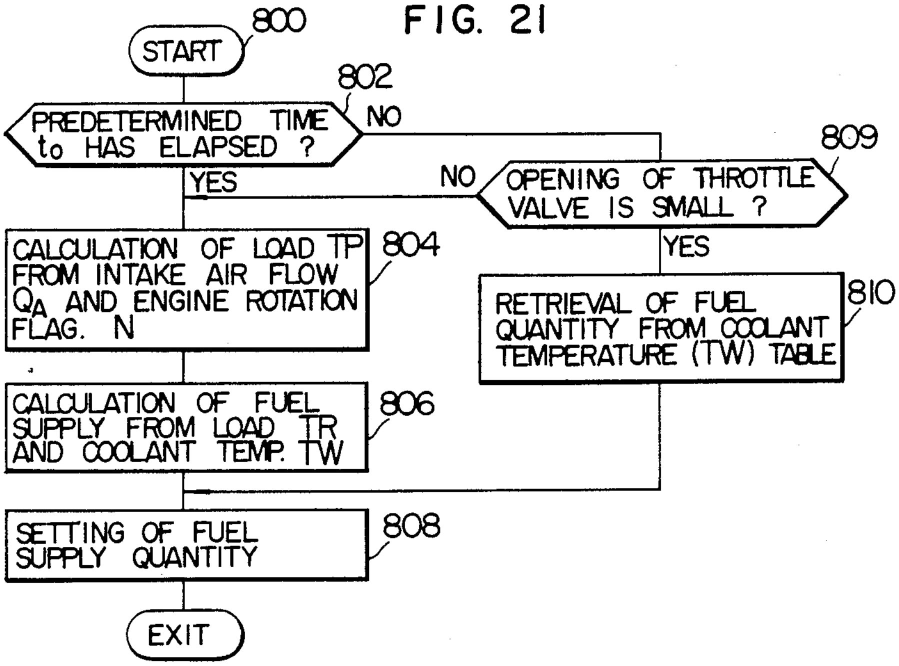
FIG. 21 shows a flow chart for illustrating another exemplary embodiment of the invention.

FIG. 21 shows another processing flow which differs from the one illustrated in FIG. 20 only in respect that a step 809 is added. This step 809 is provided with a view to making use of the output signal from the throttle angle sensor 116 described hereinbefore in conjunction with FIG. 6. When the throttle valve is detected to be in the fully closed state, which means that the acceleration pedal is not pressed down, then the processing described above in conjunction with FIG. 20 is performed at the step 810. On the other hand, when the throttle valve is not fully closed but opened, which means that the acceleration pedal is pressed down by a driver, then the number of engine rotation has to be increased. To this end, the control of the fuel supply quantity described above with reference to FIG. 20 is carried out starting from the step 804. Although it has been mentioned that the output signal from the throttle angle sensor 116 is utilized at the step 809, a throttle switch or a negative pressure (vacuum) sensor can be alternatively used to the similar effect.

The processing illustrated in FIG. 21 thus allows the engine rotation to be increased when desired, even if the time $t_o$ has not yet elapsed.

As will be appreciated from the above description, the fuel supply quantity is determined only in dependence on the temperature of engine cooling water without resorting to the aid of the output signal produced by the hot wire sensor HW, when the time span between the turn-on of the key switch and the turn-on of the ignition switch is shorter than the time required for the hot wire to be heated to a predetermined temperature. Thus, it can be positively excluded that the fuel mixture supplied to the engine is excessively enriched in the engine starting phase or mode. Besides, the engine operation as well as regulation of the exhaust gas can be optimized.

It will thus be appreciated that the invention has now provided a control system which is capable of assuring optimal fuel supply to engine in the starting operation phase.

We claim:

1. In an electronic control apparatus for an internal combustion engine in which a quantity of intake air fed to engine cylinders is detected by processing an output signal produced by an air flow sensor incorporating a heat generating element and an optimal quantity of fuel corresponding to the detected intake air quantity is supplied to the internal combustion engine, wherein said air flow sensor will produce output signals which do not accurately correspond to the actual intake air quantity when said heat generating element has a temperature below a predetermined minimum operating temperature, a correction arrangement comprising: first detecting means for detecting that a predetermined time has elapsed from a time point at which a switch of said internal combustion engine is closed to electrically energize said heat generating element until a time point at which said heat generating element is heated to reach said predetermined minimum operating temperature; and control means for controlling the optimal quantity of fuel supplied to said internal combustion engine in dependence on another control factor without making use of said output signal produced from said air flow sensor incorporating said heat generating element until said first detecting means detects that said predetermined time has elapsed regardless of whether said engine has started or not.

2. In a control apparatus according to claim 1, wherein in said first detecting means detects the lapse of said predetermined time with the aid of interval interrupts made by electronic operation means.

3. In a control apparatus according to claim 1 or 2, wherein said other control factor includes an output signal produced from a sensor for detecting temperature of cooling water of said internal combustion engine.

4. In a control apparatus according to claim 1, further including second detectig means for detecting that a throttle valve is fully closed unless said predetermined time has elapsed, wherein said optimal quantity of fuel supply is determined in correspondence with said other control factor without resorting to the use of the output signal produced from said air flow sensor incorporating the heat generating element when a detection signal outputted from said second detecting means is present, while said optimal quantity of fuel supply is determined by making use of the output signal from said air flow sensor incorporating the heat generating element when the detection signal from said second detecting means is absent.

5. In a control apparatus according to claim 4, wherein said first detecting means detects the lapse of said predetermined time with the aid of interval interrupts made by electronic operation means.

6. In a control apparatus according to claim 4 or 5, wherein said other control factor includes an output signal produced from a sensor for detecting temperature of cooling water of said internal combustion engine.

7. In a method for controlling an internal combustion engine in which a quantity of intake air fed to engine cylinders is detected by processing an output signal produced by an air flow sensor incorporating a heat generating element and in which an optimal quantity of fuel corresponding to the detected intake air quantity is supplied to the internal combustion engine, wherein said air flow sensor will produce output signals which do not accurately correspond to the actual intake air quantity when said heat generating element has a temperature below a predetermined minimum operating temperature, a correction method comprising:

detecting that a predetermined time has elapsed from a time point at which a switch of said internal combustion engine is closed to electrically energize said heat generating element until a time point at which said heat generating element is heated to reach said predetermined minimum operating temperature; and controlling the optimal quantity of fuel supplied to said internal combustion engine in dependence on another control factor without making use of said output signal produced from said air flow sensor incorporating said heat generating element until it has been detected that said predetermined time has elapsed.

8. In a method according to claim 7, wherein said detection of the lapse of said predetermined time is made with the aid of interval interrupts made by electronic operation means.

9. In a method according to claim 7 or 8, wherein said another control factor includes an output signal produced from a sensor for detecting temperature of cooling water of said internal combustion engine.

10. In a method according to claim 7, further comprising detecting that a throttle valve is fully closed unless said predetermined time has elapsed, wherein said optimal quantity of fuel supply is determined in correspondence with said another control factor without resorting to the use of the output signal produced from said air flow sensor incorporating the heat generating element when it is detected that said throttle valve is fully closed, while said optimal quantity of fuel supply is determined by making use of the output signal from said air flow sensor incorporating the heat generating element when it is detected that said throttle valve is not fully closed.

11. In a method according to claim 10, wherein said detection of the lapse of said predetermined time is made with the aid of interval interrupts made by electronic operation means.

12. In a method according to claim 10 or 11, wherein said another control factor includes an output signal produced from a sensor for detecting temperature of cooling water of said internal combustion engine.

* * * * *